(«12») United States Patent
Fu et al.

(10) Patent No.: US 10,690,919 B1
(45) Date of Patent: Jun. 23, 2020

(54) SUPERLUMINOUS LED ARRAY FOR WAVEGUIDE DISPLAY

(71) Applicant: Facebook Technologies, LLC, Menlo Park, CA (US)

(72) Inventors: Yijing Fu, Redmond, WA (US); Wanli Chi, Sammamish, WA (US); Pasi Saarikko, Kirkland, WA (US); Xinqiao Liu, Medina, WA (US); Hee Yoon Lee, Redmond, WA (US); Maxwell Parsons, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 164 days.

(21) Appl. No.: 15/896,392

(22) Filed: Feb. 14, 2018

Related U.S. Application Data

(60) Provisional application No. 62/460,419, filed on Feb. 17, 2017, provisional application No. 62/513,233, filed on May 31, 2017.

(51) Int. Cl.
*F21V 8/00* (2006.01)
*G02B 26/10* (2006.01)
*G02B 27/01* (2006.01)

(52) U.S. Cl.
CPC ....... *G02B 27/0172* (2013.01); *G02B 6/0035* (2013.01); *G02B 26/101* (2013.01); *G02B 2027/0178* (2013.01)

(58) Field of Classification Search
CPC .............. G06B 27/0172; G06B 26/101; G06B 2027/0178; G06B 6/0035
See application file for complete search history.

(56) References Cited

U.S. PATENT DOCUMENTS 6,194,119 B1  2/2001  Wolk et al.
6,304,237 B1  10/2001  Karakawa
(Continued)

FOREIGN PATENT DOCUMENTS

EP    3053513 A1    8/2016
JP    2016-109923 A    6/2016
(Continued)

OTHER PUBLICATIONS

Bos, P., "Fast-Switching Liquid-Crystal Effects for Displays," SID Information Display, ID Archive, 2011-2015, 8 pages, retrieved on Jun. 28, 2017, retrieved from the Internet: <http://informationdisplay.org/IDArchive/2007/September/FastSwitchingLiquidCrystalEffectsforDisplays.aspx>.
(Continued)

*Primary Examiner* — Ryan A Lubit
(74) *Attorney, Agent, or Firm* — Fenwick & West LLP (57) ABSTRACT

A waveguide display includes a light source, a scanning mirror assembly, an output waveguide, and a controller. The light source emits image light. The scanning mirror assembly scans the image light as scanned image light to particular locations in accordance with scanning instructions. The output waveguide includes an input area and an output area. The output waveguide receives the scanned image light emitted from the scanning mirror assembly at the input area, and output expanded image light from a portion of the output area, the location of the portion of the output area based in part on a direction of the scanned image light output from the scanning mirror assembly. The controller generates the scanning instructions and provides the scanning instructions to the scanning mirror assembly.

20 Claims, 8 Drawing Sheets

(56) References Cited

U.S. PATENT DOCUMENTS

| | | |
|---|---|---|
| 6,327,083 B1 | 12/2001 | Goldenberg et al. |
| 6,869,185 B2 | 3/2005 | Kaminsky et al. |
| 9,097,511 B2 | 8/2015 | Kuroda |
| 9,338,570 B2 | 5/2016 | Holzmann |
| 9,690,178 B2 | 6/2017 | Nishioka |
| 9,974,498 B2 | 5/2018 | Humphrey |
| 10,056,020 B2 | 8/2018 | Chi et al. |
| 10,157,559 B2 | 12/2018 | Chi et al. |
| 10,168,537 B1 | 1/2019 | Parsons |
| 10,395,575 B1 | 8/2019 | Chi et al. |
| 2004/0076203 A1 | 4/2004 | Kaminsky et al. |
| 2005/0228463 A1 | 10/2005 | Mac et al. |
| 2006/0132914 A1 | 6/2006 | Weiss et al. |
| 2008/0272379 A1* | 11/2008 | Laino ............... G02B 27/1026 257/88 |
| 2010/0246003 A1 | 9/2010 | Simmonds et al. |
| 2011/0019874 A1 | 1/2011 | Jarvenpaa et al. |
| 2011/0109880 A1 | 5/2011 | Nummela |
| 2012/0235883 A1 | 9/2012 | Border et al. |
| 2012/0235885 A1 | 9/2012 | Miller et al. |
| 2012/0235887 A1 | 9/2012 | Border et al. |
| 2012/0242698 A1 | 9/2012 | Haddick et al. |
| 2013/0077049 A1* | 3/2013 | Bohn ................... G02B 5/20 351/210 |
| 2013/0176407 A1* | 7/2013 | Curtis ................. G02B 30/27 348/52 |
| 2013/0314789 A1 | 11/2013 | Saarikko et al. |
| 2014/0098010 A1 | 4/2014 | Travis |
| 2014/0099054 A1 | 4/2014 | Black et al. |
| 2014/0168260 A1 | 6/2014 | O'Brien et al. |
| 2014/0240714 A1 | 8/2014 | Matsuu et al. |
| 2015/0002528 A1 | 1/2015 | Bohn et al. |
| 2015/0098549 A1 | 4/2015 | Humphrey |
| 2015/0098579 A1 | 4/2015 | Holzmann |
| 2015/0146301 A1* | 5/2015 | Wong ................. G02B 27/0101 359/633 |
| 2015/0289762 A1 | 10/2015 | Popovich et al. |
| 2016/0041384 A1 | 2/2016 | Robbins et al. |
| 2016/0055822 A1 | 2/2016 | Bell |
| 2016/0190385 A1 | 6/2016 | Nishioka |
| 2016/0379606 A1 | 12/2016 | Kollin et al. |
| 2017/0039960 A1* | 2/2017 | Jepsen ............... G02B 27/0101 |
| 2017/0131546 A1 | 5/2017 | Woltman et al. |
| 2017/0131551 A1 | 5/2017 | Robbins et al. |
| 2017/0139210 A1 | 5/2017 | Vallius |
| 2017/0153460 A1 | 6/2017 | Vallius et al. |
| 2017/0184848 A1 | 6/2017 | Vallius |
| 2017/0235143 A1 | 8/2017 | Chi et al. |
| 2017/0236463 A1 | 8/2017 | Chi et al. |
| 2017/0343186 A1* | 11/2017 | Wang ................. G02B 27/0172 |
| 2018/0052325 A1 | 2/2018 | Bohn |
| 2018/0090058 A1* | 3/2018 | Chen ................... G09G 3/32 |
| 2018/0120559 A1 | 5/2018 | Yeoh et al. |
| 2018/0130391 A1 | 5/2018 | Bohn |
| 2018/0131926 A1* | 5/2018 | Shanks ............... H04N 13/383 |
| 2018/0172995 A1 | 6/2018 | Lee et al. |
| 2018/0284884 A1 | 10/2018 | Sulai et al. |
| 2019/0004325 A1 | 1/2019 | Connor |
| 2019/0285898 A1 | 9/2019 | Parsons |

FOREIGN PATENT DOCUMENTS

| | | |
|---|---|---|
| TW | 201624754 A | 7/2016 |
| WO | WO 2013/163347 A1 | 10/2013 |
| WO | WO 2015/078788 A1 | 6/2015 |
| WO | WO 2016/020643 A1 | 2/2016 |

OTHER PUBLICATIONS

Compound Photonics, "4K Display, Features, Applications," 2017-2018, 2 pages, retrieved on Jun. 28, 2017, retrieved from the Internet: <https://www.compoundphotonics.com/products/4k-display/>.

European Extended Search Report, European Application No. 17208645.6, dated May 3, 2018, 8 pages.

Jasper Display Corporation, "The World's Smallest Pixel 4K2K LCoS Microdisplay, JD4704, Won the 2014 Taiwan Outstanding Photonics Product Award," Success Story, Jul. 4, 2014, 3 pages, retrieved from the Internet: <http://www.jasperdisplay.com/success-stories/>.

Okada, N., et al., "Horizontally Scanning Holography to Enlarge Both Image Size and Viewing Zone Angle," SPIE Proceedings, Practical Holography XXIII: Materials and Applications, Feb. 3, 2009, vol. 7233, 8 pages.

PCT International Search Report and Written Opinion, PCT Application No. PCT/US2019/017672, dated Jul. 25, 2019, 10 pages.

PCT International Search Report and Written Opinion, PCT Application No. PCT/US2018/024737, dated Jul. 17, 2018, 17 pages.

Srivastava, A. K., et al., "Fast Switchable Grating Based on Orthogonal Photo Alignments of Ferroelectric Liquid Crystals," AIP Applied Physics Letters, Jul. 2012, vol. 101, Issue 3, 8 pages, retrieved from the Internet: <http://aip.scitation.org/doi/abs/10.1063/1.4737642?journalCode=apl&>.

Szentesi, J., et al., "Holographic 3D Visualization, Development of the Next Generation Holo-Display Based on Emerging Optical and Opto-Electronic Technologies," State of the Art in LCOS, Holovision, Apr. 30, 2008, Project No. IST-FP6-004524, retrieved from the Internet: <http://holovisionproject.holografika.eu/news_files/60_53.2_2%20State-of-the-art%20in%20LCOS_public>.

Taiwan Intellectual Property Office, Office Action, Taiwan Application No. 108108496, dated Oct. 8, 2019, 13 pages.

United States Office Action, U.S. Appl. No. 15/292,556, dated Mar. 30, 2018, 6 pages.

United States Office Action, U.S. Appl. No. 16/508,185, dated Oct. 1, 2019, 7 pages.

Young, L. R., et al., "Survey of Eye Movement Recording Methods," Behavior Research Methods & Instrumentation, 1975, vol. 7, Issue 5, pp. 397-429.

* cited by examiner

SUPERLUMINOUS LED ARRAY FOR WAVEGUIDE DISPLAY

CROSS REFERENCE TO RELATED APPLICATIONS

This application claims the benefit of U.S. Provisional Application No. 62/460,419, filed Feb. 17, 2017, and the U.S. Provisional Application No. 62/513,233, filed May 31, 2017, which are incorporated by reference in its entirety.

BACKGROUND

This disclosure relates generally to near-eye-displays, and in particular, to micro-display projectors with very high brightness.

In conventional display designs in near-eye-displays, the important factors considered are brightness, resolution/FOV, and compactness. In AR applications using next generation displays, often a wideband source is preferred over a single wavelength laser. LEDs are a good choice for such displays due to their wide spectrum. Even though the LEDs used for such displays generate light with a better temporal coherency (i.e. uniform illumination over an extended period of time) along with a wide spectrum, conventional LEDs lack a spatial coherency (i.e. a collimated beam of light).

Accordingly, the conventional display designs in near-eye-displays lack light sources that generate an image light with very high brightness that has both spatial and temporal coherence.

SUMMARY

A waveguide display includes a light source, a scanning mirror assembly, an output waveguide, and a controller. The light source emits image light. In some embodiments, the light source is a 1-D linear array of Superluminous LEDs (SLEDs), where each SLED corresponds to a respective row in an image ultimately displayed to the user. The 1-D array may be densely packed or sparsely packed in a single light source. The scanning mirror assembly scans the image light to particular locations as scanned image light in accordance with scanning instructions. In some embodiments, the scanning mirror assembly includes one or more scanning mirrors that scan in one dimension along the linear array of SLEDs and redirects the image light onto an entrance location of the output waveguide. The output waveguide includes an input area and an output area. The output waveguide receives the scanning image light emitted from the scanning mirror assembly at the input area, and output expanded image light from a portion of the output area, and a location of the portion of the output area based in part on a direction of the scanned image light output from the scanning mirror assembly. The controller generates the scanning instructions and provides the scanning instructions to the scanning mirror assembly. In one example, the light source performs a temporal modulation of the image light to emit a temporally modulated image light, and the scanning mirror assembly performs a scanning of the temporally modulated image light in accordance with a target frame rate of the expanded image light.

In some embodiments, the light source is a 2-D array of VCSEL like structures that are similar to VCSELs, except they are modified to operate as SLEDs and not as VCSELs (i.e., lasers). Additionally, in some embodiments, multiple source assemblies of different colors (e.g., red, green, blue) may be combined such that the image output by the waveguide display is in color.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A waveguide display includes a source assembly and an output waveguide. The source assembly includes a source and a scanning mirror assembly. In some embodiments, the source is a 1-D linear array of Superluminous LEDs (SLEDs), where each SLED corresponds to a respective row in an image ultimately displayed to the user. The 1-D array may be densely packed or sparsely packed in a single source. The scanning mirror assembly includes one or more scanning mirrors that scan in one dimension along the linear array of SLEDs and redirects the image light onto an entrance location of the output waveguide. The output waveguide outputs the light at a location offset from the entrance location, and the location/direction of the emitted light is based in part on the orientation of the scanning mirror assembly.

In the sparsely packed embodiments, the source may oscillate in space between two or more positions—where light emitted at each position corresponds to a different portion of the image output by the waveguide display. In alternate embodiments, the source is a 2-D array of VCSEL like structures that are similar to VCSELs, except they are modified to operate as SLEDs and not as VCSELs (i.e., lasers). Additionally, in some embodiments, multiple source assemblies of different colors (e.g., red, green, blue) may be combined such that the image output by the waveguide display is in color.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
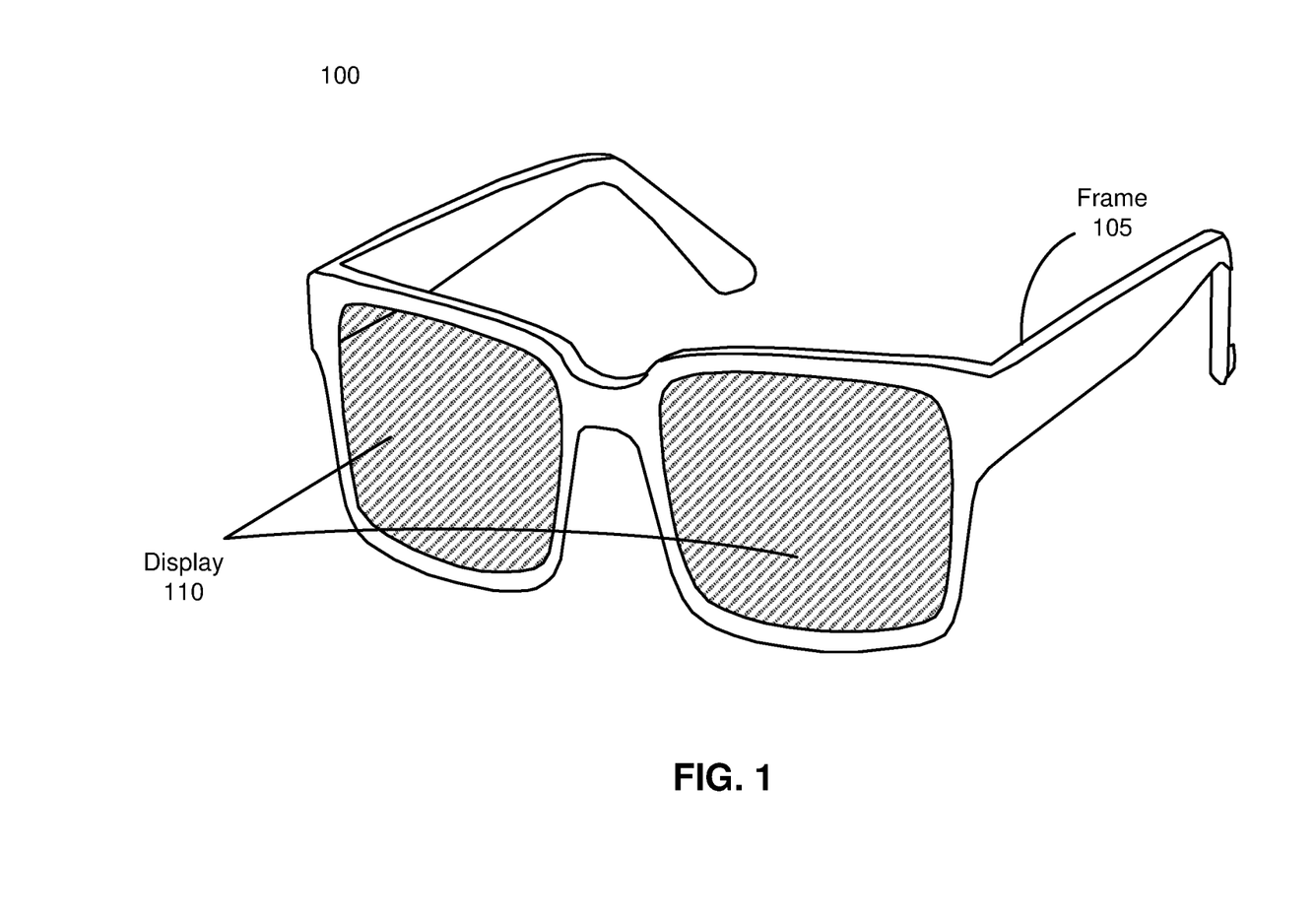
FIG. 1 is a diagram of a near-eye-display (NED), in accordance with an embodiment.

FIG. 1 is a diagram of a near-eye-display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes at least one source assembly to generate an image light to present media to an eye of the user. The source assembly includes, e.g., a source, an optics system, or some combination thereof.

FIG. 1 is only an example of a VR system. However, in alternate embodiments, FIG. 1 may also be referred to as a Head-Mounted-Display (HMD).

Figure 2:
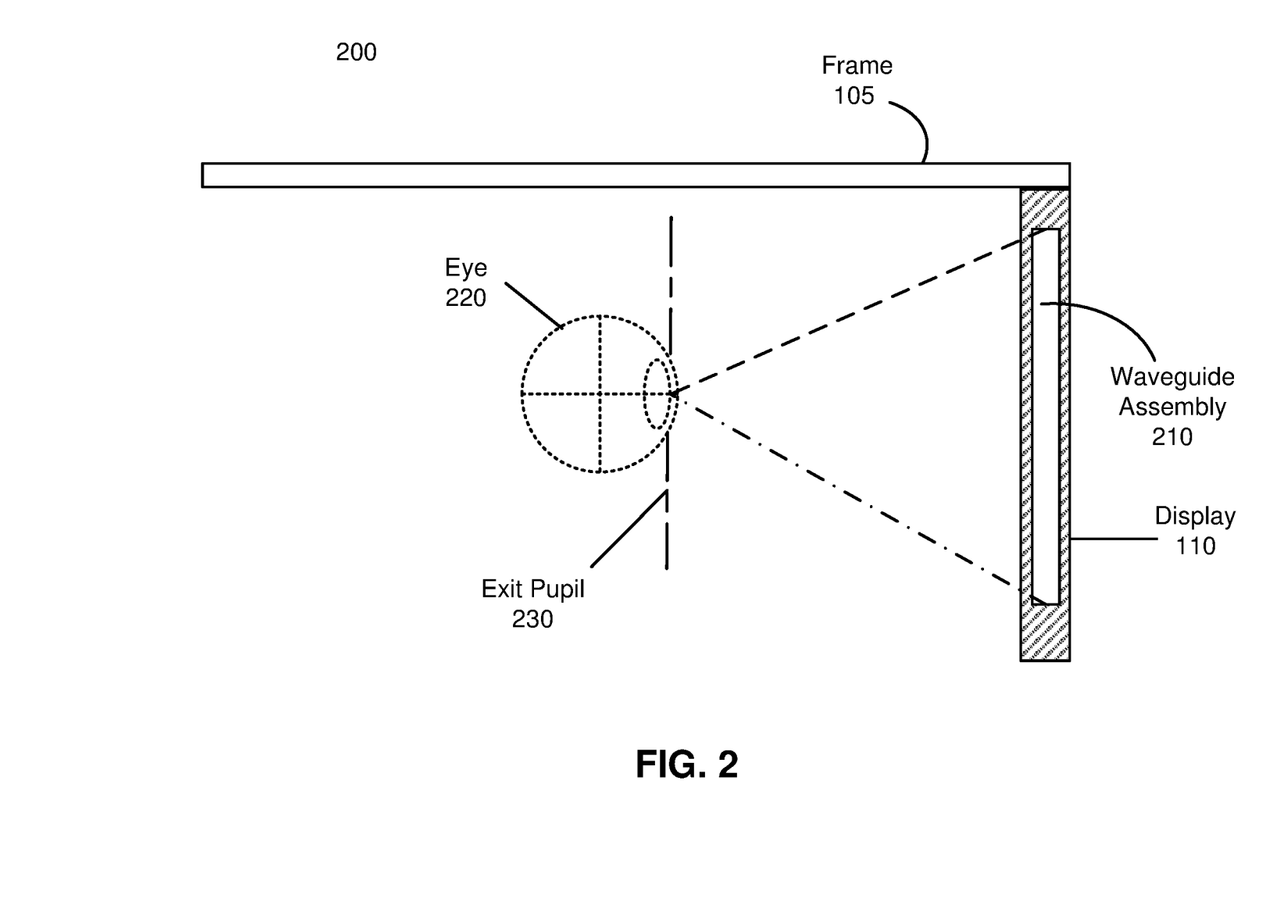
FIG. 2 is a cross-section of an eyewear of the NED illustrated in FIG. 1, in accordance with an embodiment.

FIG. 2 is a cross section 200 of the NED 100 illustrated in FIG. 1, in accordance with an embodiment. The cross section 200 includes at least one waveguide assembly 210, and an exit pupil 230. The exit pupil 230 is a location where the eye 220 is positioned when the user wears the NED 100. In some embodiments, the frame 105 may represent a frame of eye-wear glasses. For purposes of illustration, FIG. 2 shows the cross section 200 associated with a single eye 220 and a single waveguide assembly 210, but in alternative embodiments not shown, another waveguide assembly which is separate from the waveguide assembly 210 shown in FIG. 2, provides image light to another eye 220 of the user.

The waveguide assembly 210, as illustrated below in FIG. 2, is configured to direct the image light to the eye 220 through the exit pupil 230. The waveguide assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the waveguide assembly 210 and the eye 220. The optical elements may act to, e.g., correct aberrations in image light emitted from the waveguide assembly 210, magnify image light emitted from the waveguide assembly 210, some other optical adjustment of image light emitted from the waveguide assembly 210, or some combination thereof. The example for optical elements may include an aperture, a Fresnel lens, a convex lens, a concave lens, a filter, or any other suitable optical element that affects image light.

In some embodiments, the waveguide assembly 210 may include a source assembly to generate an image light to present media to user's eyes. The source assembly includes, e.g., a source, an optics system, or some combination thereof.

Figure 3:
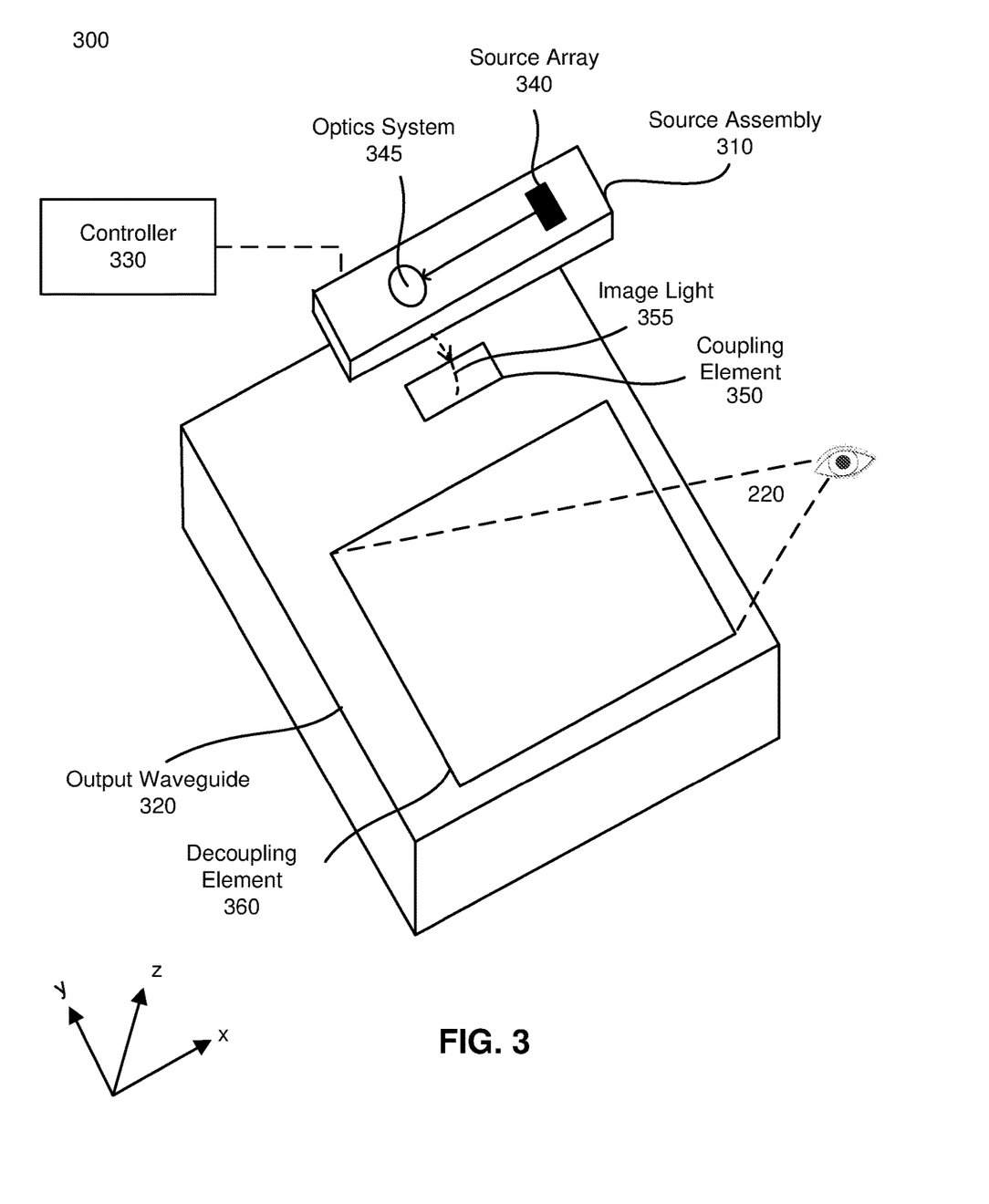
FIG. 3 illustrates an isometric view of a waveguide display, in accordance with an embodiment.

FIG. 3 illustrates an isometric view of a waveguide display 300, in accordance with an embodiment. In some embodiments, the waveguide display 300 (may also be referred to as a scanning waveguide display) is a component (e.g., waveguide assembly 210) of the NED 100. In alternate embodiments, the waveguide display 300 is part of some other NED, or other system that directs display image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The source assembly 310 generates image light. The source assembly 310 includes a source array 340 and an optics system 345 (e.g., as further described below with regard to FIG. 4). The source array 340 is an optical component that generates image light using a plurality of light source elements placed in an array. The source array 340 generates an image light including, but not restricted to, a red image light, a blue image light, a green image light, an infra-red image light, etc. In some configurations, the source array 340 generates a first image light corresponding to a first band of wavelengths and a second image light corresponding to a second band of wavelengths. In one example, the first band of wavelengths is in the range of 700 nm to 1400 nm. The plurality of light source elements may include a ridge waveguide structure, a VCSEL-based light emitter, etc., as described in detail below in conjunction with FIG. 5A-B and FIG. 6.

The optics system 345 performs a set of optical processes, including, but not restricted to, focusing, combining, conditioning, and scanning processes on the image light generated by the source array 340. In some embodiments (not illustrated), the optics system 345 includes a combining assembly, a light conditioning assembly, and a scanning mirror assembly, as described below in detail in conjunction with FIG. 4. The source assembly 310 generates and outputs an image light 355 to a coupling element 350 of the output waveguide 320.

The output waveguide 320 is an optical waveguide that outputs image light to an eye 220 of a user. The output waveguide 320 receives the image light 355 at one or more coupling elements 350, and guides the received input image light to one or more decoupling elements 360. In some embodiments, the coupling element 350 couples the image light 355 from the source assembly 310 into the output waveguide 320. The coupling element 350 may be, e.g., a diffraction grating, a holographic grating, some other element that couples the image light 355 into the output waveguide 320, or some combination thereof. For example, in embodiments where the coupling element 350 is diffraction grating, the pitch of the diffraction grating is chosen such that total internal reflection occurs, and the image light 355 propagates internally toward the decoupling element 360. For example, the pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 is controlled by changing an orientation and position of the image light 355 entering the coupling element 350. For example, the pitch of the diffraction grating may be in the range of 300 nm to 600 nm.

The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 controls the scanning operations of the source assembly 310. The controller 330 determines scanning instructions for the source assembly 310 based at least on the one or more display instructions. Display instructions are instructions to render one or more images. In some embodiments, display instructions may simply be an image file (e.g., bitmap). The display instructions may be received from, e.g., a console of a VR system (not shown here). Scanning instructions are instructions used by the source assembly 310 to generate image light 355. The scanning instructions may include, e.g., a type of a source of image light (e.g., monochromatic, polychromatic), a scanning rate, an orientation of a scanning apparatus, one or more illumination parameters (described below with reference to FIG. 4), or some combination thereof. The controller 330 includes a combination of hardware, software, and/or firmware not shown here so as not to obscure other aspects of the disclosure.

Figure 4:
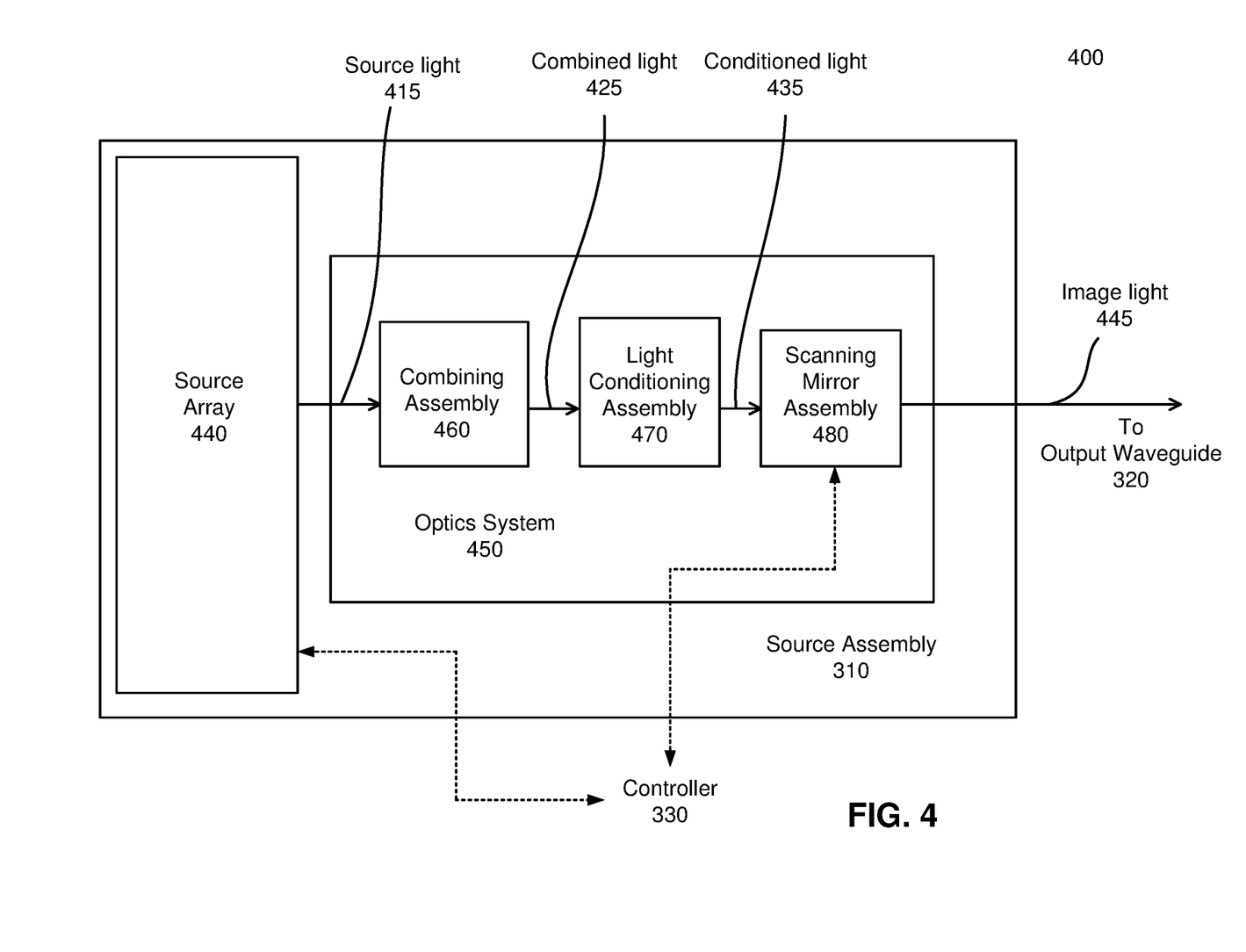
FIG. 4 illustrates a block diagram of a source assembly, in accordance with an embodiment.

FIG. 4 illustrates a cross section 400 of the source assembly 310, in accordance with an embodiment. The cross section 400 of the source assembly 310 includes a source array 440 and an optics system 450. The source array 440 is an embodiment of the source array 340 of FIG. 3. The optics system 450 is an embodiment of the optics system 345 of FIG. 3.

The source assembly 310 generates light in accordance with scanning instructions from the controller 330. The source assembly 310 includes a source array 440, and an optics system 450. The source array 440 is a source of light that generates a spatially coherent or a partially spatially coherent image light. The source array 440 may be, e.g., a superluminous LED, a laser diode, a vertical cavity surface emitting laser (VCSEL), a light emitting diode, a tunable laser, or some other light source that emits coherent or partially coherent light. The source array 440 emits light in a visible band (e.g., from about 390 nm to 700 nm), and it may emit light that is continuous or pulsed. In some embodiments, the source array 440 may be a superluminous LED (SLED) array of densely packed ridge waveguides with a wide emission spectrum. The source array 440 emits light in accordance with one or more illumination parameters received from the controller 330. An illumination parameter is an instruction used by the source array 440 to generate light. An illumination parameter may include, e.g., source wavelength, pulse rate, pulse amplitude, beam type (continuous or pulsed), other parameter(s) that affect the emitted light, or some combination thereof.

The source array 440 is a source of light that generates at least a spatially coherent or partially spatially coherent image light. The source array 440 includes one or more source elements 520, as described below in conjunction with FIGS. 5A-B. The source element 520 may be, e.g., SLEDs, MicroLEDs, organic LEDs (OLEDs), and organic MicroLEDs. In one example, the source array 440 is a one-dimensional linear array of SLEDS, where each SLED corresponds to a respective row in an image ultimately displayed to the user. In one embodiment, the source array 440 includes a plurality of ridge waveguides with a constant pixel pitch between each of the ridge waveguides. In another embodiment, a portion of the source array 440 includes a plurality of Vertical Cavity Surface Emitting Lasers (VCSEL) based light emitters.

The source array 440 emits a source light 415. In some embodiments, the source light 415 includes a red image light, a green image light, a blue image light, an infra-red image light, or some combination thereof. In another embodiment, the source light 415 includes an infrared light.

The optics system 450 includes one or more optical components that condition the light from the source array 440. Conditioning light from the source array 440 may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. Light emitted from the optics system 450 (and also the source assembly 310) is referred to as an image light 445. The optics system 450 outputs the image light 445 at a particular orientation (in accordance with the scanning instructions) toward the output waveguide 320.

The optics system 450 includes a combining assembly 460, a light conditioning assembly 470, and a scanning mirror assembly 480. The combining assembly 460 combines the source light 415 outputted by the source array 440 and transmits a combined light 425 to the light conditioning assembly 470, as described below in conjunction with FIG. 7 and FIG. 8.

The light conditioning assembly 470 conditions the combined light 425 and emits a conditioned light 435 to the scanning mirror assembly 480. The conditioned light 435 is a light conditioned for incidence on the scanning mirror assembly 480. The light conditioning assembly 470 includes one or more optical components that condition the light from the source array 440. Conditioning light from the source array 440 may include, e.g., expanding, collimating, correcting for one or more optical errors (e.g., field curvature, chromatic aberration, etc.), some other adjustment of the light, or some combination thereof. The light conditioning assembly 470 conditions the source light 415 and emits the conditioned light 435 to the scanning mirror assembly 480.

The scanning mirror assembly 480 includes one or more optical elements that redirect image light via one or more reflective portions of the scanning mirror assembly 480. Where the image light is redirected toward is based on specific orientations of the one or more reflective portions. In some embodiments, the scanning mirror assembly 480 includes a single scanning mirror that is configured to scan in at least two dimensions. In other embodiments, the scanning mirror assembly 480 may include a plurality of scanning mirrors that each scan in orthogonal directions to each other. The scanning mirror assembly 480 may perform a raster scan (horizontally, or vertically), a biresonant scan, or some combination thereof. In some embodiments, the scanning mirror assembly 480 may perform a controlled vibration along the horizontal and/or vertical directions with a specific frequency of oscillation to scan along two dimensions and generate a two-dimensional projected line image of the media presented to user's eyes. The scanning mirror assembly 480 emits the image light 445 based on the conditioned light 435. In one example, the source assembly 330 performs a temporal modulation of the source light 415 to emit a temporally modulated image light, and the scanning mirror assembly 480 performs a scanning of the temporally modulated image light in accordance with a target frame rate of the image light 445. The temporal modulation is such that each light source of the source assembly 330, in synchronization with the scanning mirror assembly 480, repeats a projection of the image light 445, and thus, effectively increasing the refresh rate of the image light 445 by the number of SLEDs in each color channel of the source assembly 330.

In some embodiments, the scanning mirror assembly 480 includes a galvanometer mirror. For example, the galvanometer mirror may represent any electromechanical instrument that indicates that it has sensed an electric current by deflecting a beam of image light with one or more mirrors. The galvanometer mirror may be configured to scan in at least one orthogonal dimension to generate the image light 445. The image light 445 from the galvanometer mirror represents a two-dimensional line image of the media presented to user's eyes.

The scanning mirror assembly 480 performs an array translation of pixel positions to achieve a desired frame rate in accordance with the source light 415 outputted by the source array 440. For example, the scanning mirror assembly 480 moves by one pixel position from a first instance of time to a second instance of time based on the desired level of brightness from the given number of pixel positions of the source array 440. In another example, the scanning mirror assembly 480 performs an overlaying of RGB pixels with a time delay shorter than the response time of a human eye to direct a full colored image light. In some configurations, the scanning mirror assembly 480 includes at least one two-dimensional MEMS mirror that performs a scanning of the conditioned light 435 with a reduced bandwidth. In typical scanning mirror assemblies which do not perform the array translation, the bandwidth required could be as high as 50-100 kHz. In contrast, the scanning mirror assembly 480 performs the scanning with a bandwidth based on the number source elements 520 in the source array 440. For example, when the source array 440 includes three source elements 520 emitting a red image light, the bandwidth of the scanning mirror assembly 480 is less than 20 kHz. In another example, the scanning mirror assembly 480 includes a two-dimensional MEMS mirror performing a scanning with a bandwidth of 20 kHz.

The controller 330 controls the source array 440 and the scanning mirror assembly 480. The controller 330 takes content for display, and divides the content into discrete sections. The controller 330 instructs the source array 440 to sequentially present the discrete sections using individual source elements corresponding to a respective row in an image ultimately displayed to the user. The controller 330 instructs the scanning mirror assembly 480 to scan the presented discrete sections to different areas of a coupling element of the output waveguide 320. Accordingly, at the exit pupil of the output waveguide 320, each discrete portion is presented in a different location. While each discrete section is presented at different times, the presentation and scanning of the discrete sections occurs fast enough such that a user's eye integrates the different sections into a single image or series of images. The controller 330 may also provide scanning instructions to the source array 440 that include an address corresponding to an individual source element of the source array 440 and/or an electrical bias applied to the individual source element.

The image light 445 is an embodiment of the image light 355 of FIG. 3. The image light 445 couples to the output waveguide 320 as described above with reference to FIG. 3.

Figure 5A:
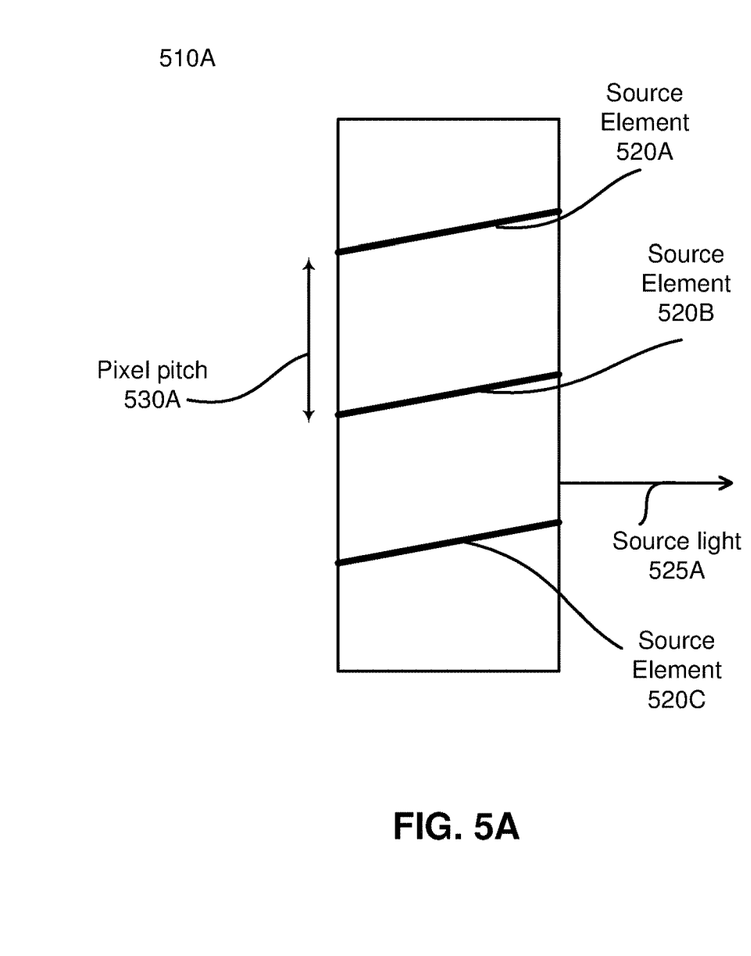
FIG. 5A illustrates a source array, in accordance with an embodiment.
Figure 5B:
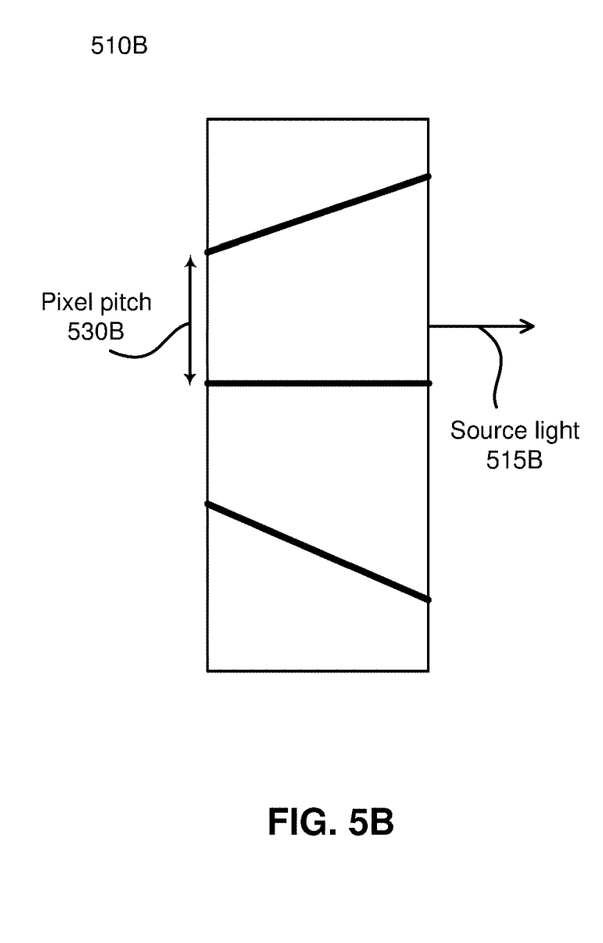
FIG. 5B illustrates a source array with a fan-out device structure, in accordance with an embodiment.
Figure 6:
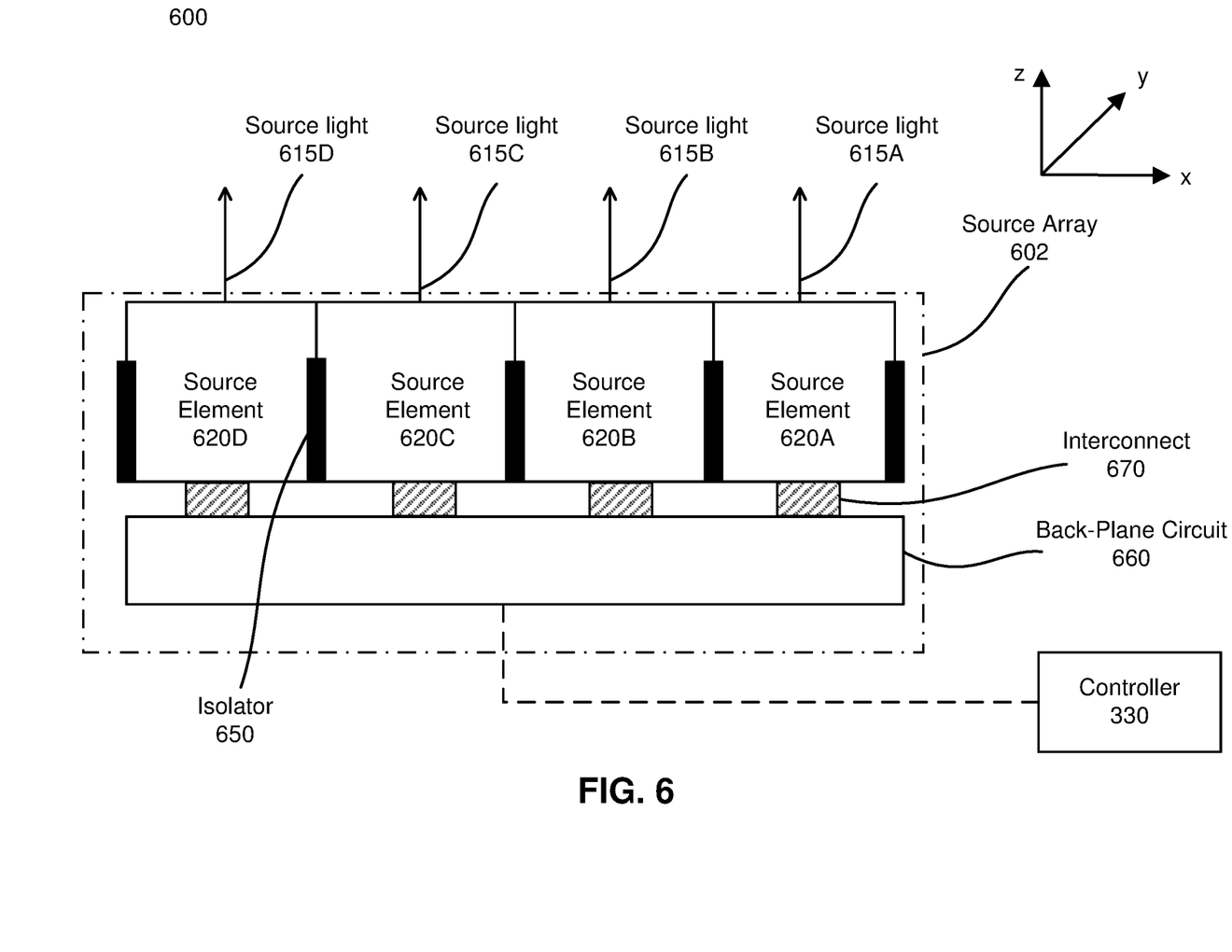
FIG. 6 illustrates a portion of a source array arranged vertically, in accordance with an embodiment.

Turning now to a discussion of source array geometries and source element organization, FIGS. 5A-B and FIG. 6 depict various layouts for the source array 440.

FIG. 5A illustrates a source array 510A, in accordance with an embodiment. The source array 510A is an embodiment of the source array 440 of FIG. 4. The source array 510A includes a source element 520A, a source element 520B, and a source element 520C. The source array 510A emits a source light 525A that is spatially and temporally coherent image light. In alternate embodiments, the source light 525A includes a partially spatial and a partially temporal coherent image light.

In some embodiments, the source array 510A includes a plurality of source elements that are arranged in a one-dimensional array. In the example of FIG. 5A, the source element 520A and the source element 520B include a pixel pitch 530A. The pixel pitch 530A is a distance of separation between two source elements. The pixel pitch 530A can be in the range of 2 to 10 microns for a densely packed source array 510A that illuminates a continuous display pixels. The continuous display pixel includes the source element 520A and the source element 520B having a pixel pitch 530A less than a threshold value such the source element 520A and the source element 520B are in adjacent positions with reference to the orientation of the scanning mirror assembly 480. In one example, the source array 510A includes a densely packed device structure comprising at least the source element 520A that emits a spatially and temporally coherent image light. In alternate configurations, the densely packed device structure with the source element 520A emits a partially spatial and a partially temporal coherent image light.

The pixel pitch 530A can be in the range of 10 microns to 1 millimeter for a sparsely packed source array 510A that can be illuminated in an interlaced fashion. The sparsely packed source array 510A may oscillate in space between two or more positions—where light emitted at each position corresponds to a different portion of the image output by the waveguide display 300.

In another embodiment, the source element 520A includes a ridge waveguide structure. The ridge waveguide structure is a circular or rectangular waveguide having one or more longitudinal internal ridges that provides a stronger optical confinement due to the presence of a material with a lower index of refraction than the ridges (e.g. air) surrounding the three sides of the ridge waveguide. The source elements 520B and 520C also include the ridge waveguide structure.

In some configurations, the source array 510A includes a color converter (not shown) coupled to the source element 520A to provide a full-colored image light. A color converter is a device that converts a light of specific band of wavelengths to a different band of wavelengths. The color converter may include a doped fiber, a phosphor, nanophosphors, colloidal and epitaxial quantum dots. For example, the color converter may include a green converter that converts an image light of a particular range of wavelength (e.g. a blue-colored image light) into a green-colored image light.

In an alternate embodiment, the source array 510A includes three source elements 520A, 520B, and 520C that are densely packed with each of the source elements cross talking to each other. For example, each of the source elements may include a ridge waveguide providing a slightly different center emission wavelength (~5-10 nm away). The combination of the image light from each of the source elements provides a pixel with an emission spectrum of at least 30 nm full-width half maximum.

FIG. 5B illustrates a source array 510B with a fan-out device structure, in accordance with an embodiment. The source array 510B is an embodiment of the source array 440 of FIG. 4. The source array 510B is functionally similar to the source array 510A except for the fan-out device structure of the source elements. In the example of FIG. 5B, the source array 510B includes a plurality of source elements with a pixel pitch 530B. Each of the plurality of source elements are arranged in a fan-out device structure in order to reduce the pixel cross talk between each of the source elements while maintaining a constant value of the pixel pitch 530B. The fan-out device structure is a configuration that increases the separation between the source elements such that the image light from a first source element is not coupled into the image light from a second source element. The fan-out device structure may be based on a separation of non-transmissive material, a separate waveguide/fiber for each source element, or some combination thereof.

FIG. 6 illustrates a portion 600 of a source array 602 arranged vertically, in accordance with an embodiment. In some embodiments, the source array 602 is an embodiment of the source array 440. The source array 640 includes source elements 620A, 620B, 620C, 620D, a plurality of isolators 650, a back-plane circuit 660, and a plurality of interconnects 670. The source array 602 is an embodiment of the source array 340 of FIG. 3. In some configurations, the source array 602 is a two-dimensional array of the source element 620A.

The source element 620A is an optical element that generates an image light that is at least partially spatially and temporally coherent. In some embodiments, the source element 620A includes a light emitter based on a p-i-n device structure used in a conventional Vertical Cavity Surface Emitting Laser (VCSEL). In one example, the p-i-n device structure includes a tri-layer stack including a p-type contact layer, an active region, and an n-type layer. The p-type contact layer and the n-type layer may each include a layer of semiconducting material (e.g. Gallium Arsenide). The active region may include a plurality of quantum wells with each quantum well having a stack of one or more materials of a threshold value of thickness and composition. Note that a conventional VCSEL with a similar p-i-n device structure will have a spatial and temporal coherency and an optical power in the range of 1 to 40 mW.

In some configurations (not illustrated), the source element 620A includes one or more Bragg reflectors at the top and the bottom of the active region in the p-i-n device structure. For example, the source element 620A includes a p-type Bragg reflector in the p-type contact layer and an n-type Bragg reflector in the n-type layer. The reflectivity of each of the Bragg reflectors is reduced by decreasing the modulation of the index of refraction or adjusting the period of the Bragg grating in order to reduce the quality factor of the optical cavity in the p-i-n device structure in order to prevent lasing. Note that in conventional VCSEL-based light emitters without the Bragg reflectors, the performance of the device would be limited by the high temporal coherence to be compatible with an exit pupil expander. In contrast, a SLED-based light emitter with a broader spectral bandwidth is compatible with the exit pupil expander. In the examples where the source array 440 includes SLED-based light emitters, the spectral bandwidth is 4-10 nm, which is much broader than the VCSEL-based light emitters having a spectral bandwidth typically less than 1 nm.

The isolator 650 is an optical element that separates two adjacent light emitters and allows the transmission of light along a given direction. The isolator 650 includes an optical device composed of a thin layer of material with a low transmissivity (e.g., silver, chrome, gold) that allows the source light 615A and the source light 615B to exit the source array 602 along the Z-dimension as shown in the example of FIG. 6. The source array 602 includes multiple isolators 650 that separate adjacent source elements, for example, the source element 620B and the source element 620C.

The back-plane circuit 660 is an electrical circuit that generates electrical signals to address an individual cell and/or to electrically drive multiple optical components. In some embodiments, the back-plane circuit 660 includes a CMOS based electrical circuit with one or more cell addressing circuits and one or more driver circuits that receive scanning instructions from the controller 330. For example, an addressing circuit may include a CMOS based digital logic circuit that can communicate with the source array 602 through an interconnect 670 by addressing each of the source elements with a two-dimensional co-ordinate system. The interconnect 670 includes a conducting layer that bonds the source element 620A with the back-plane circuit 660. In some configurations, the conducing layer includes micro bumps with a pitch of few microns and/or direct copper to copper bonding. In the example of FIG. 6, the addressing circuit may address the source element 620B with an address of (1,0) wherein the values '1' and '0' refer to the co-ordinates along the X-dimension and the Y-dimension. In alternate configurations, the back-plane circuit 660 may include a different addressing scheme, and as such, the addressing scheme discussed in conjunction with FIG. 6 is only an example of an implementation of the addressing circuit. In a different configuration, the source array 602 can be addressed in an X/Y (row/column) grid architecture. A digital decoder, which is part of a back-plane circuit 660 described below, decodes the input row/column address and selects the appropriate source element 620A from the decoded coordinates.

The back-plane circuit 660 also includes a driver circuit that drives the optical components of the source array 602 through one or more interconnects 670. In some configurations, the driver circuit includes a selector switch that toggles between an electrical bias corresponding to a direct modulation, a pulse width modulation, and a combination of the direct modulation and the pulsed width modulation. For example, the back-plane circuit 660 applies a driving current of at most 200 mA for both the direct modulation scheme and the pulsed width modulation scheme. The back-plane circuit 660 drives the source array 602 with a combined electrical bias including the direct modulation and the pulse width modulation in order to reduce the bandwidth requirement to less than 20 kHz based on the number of source elements in the source array 602 for scanning the source array 602 without any color non-uniformity.

In some embodiments, the back-plane circuit 660 may be a component of the controller 330 of FIG. 3. For example, the back-plane circuit 660 may interface with one or more display memory buffers and one or more control circuits located inside the controller 330. The controller 330 provides scanning instructions to the source array 602 and the provided scanning instructions may include the address of the source element 620A. In some configurations, the controller 330 also stores the individual addresses of the source elements in the display memory buffers.

The source light 615A is an image light emitted by the source element 620A. In some embodiments, the source light 615A is image light of a particular band of wavelength. In some embodiments, the source light 615A includes at least one of the red image light, green image light, and blue image light. The source light 615A may also include an infra-red image light. The source lights 615B, 615C, and 615D are different embodiments of the source light 615A. In some configurations, each of the source lights 615A, 615B, 615C, and 615D may be combined to generate a full-colored image light.

Figure 7:
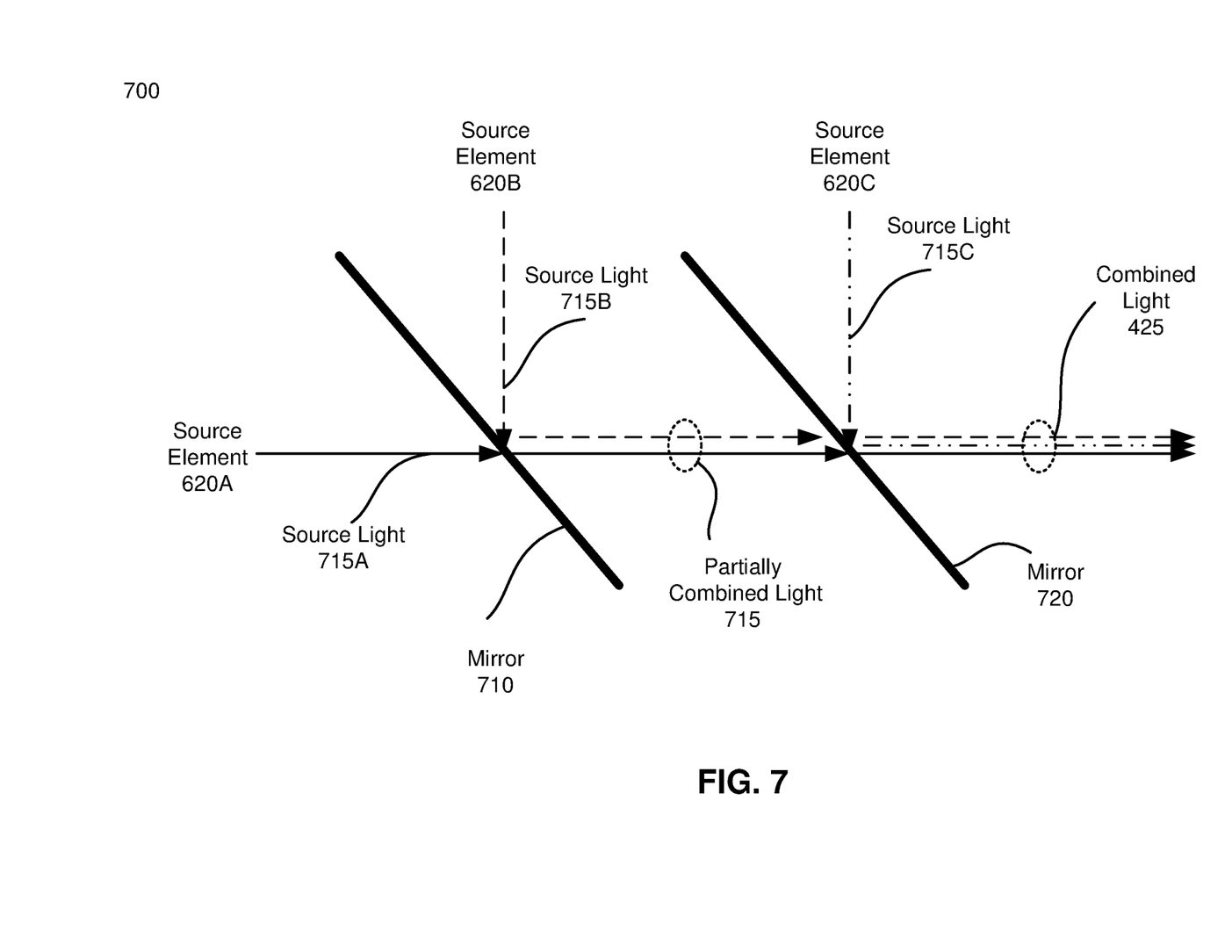
FIG. 7 illustrates a combining assembly including a plurality of dichroic mirrors, in accordance with an embodiment.

FIG. 7 illustrates a combining assembly 700 including a plurality of dichroic mirrors, in accordance with an embodiment. The combining assembly 700 is an embodiment of the combining assembly 460 of FIG. 4. The combing assembly 700 includes a mirror 710 and a mirror 720. The mirrors 710 and 720 are dichroic mirrors. Each of the mirrors 710 and 720 have a respective transmission passband and respective reflection passband. A transmission passband is a band of wavelengths within which the mirrors 710 and 720 transmits an incident light. A reflection passband is a band of wavelengths within which the mirrors 710 and 720 reflects an incident light. The mirror 710 has a transmission passband that includes light emitted by the source element 620A, and has a reflection passband that includes light emitted from the source element 620B. In contrast, the mirror 720 has a transmission passband that includes light emitted by the source element 620A and 620B, and has a reflection passband that includes light emitted from the source element 620C. Light from the source element 620 is transmitted by the mirror 710. Light from the source element 620B is reflected by the mirror 710 such that it creates a partially combined light 715. The partially combined light 715 is transmitted by the mirror 720. And light from the source element 620C is reflected by the mirror 720 such that it combines with the partially combined light 715 to form the combined light 425. While FIG. 7 illustrates an example including two mirrors and three different source elements, in other embodiments, more and/or less mirrors and/or light from source elements may be combined in similar manner to form the combined light 425. In alternate embodiments, the source element 620A may be replaced by the source element 520A of FIG. 5A.

Figure 8:
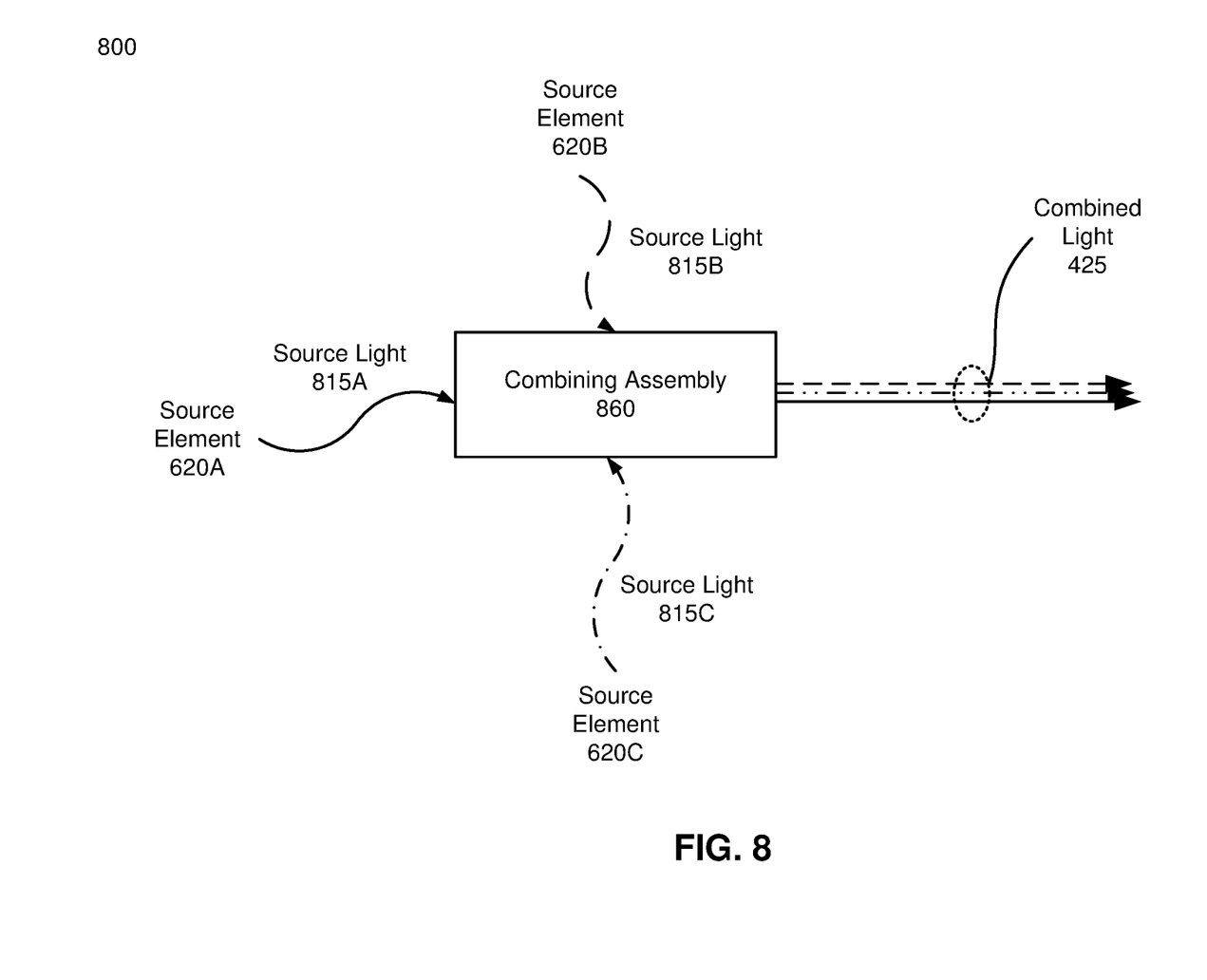
FIG. 8 illustrates a combining assembly including a fiber array, in accordance with an embodiment.

FIG. 8 illustrates a combining assembly 860 including a fiber array (not illustrated), in accordance with an embodiment. The fiber array includes a set of optical fibers configured to transmit an image light toward the combining assembly 860. The fiber array is a plurality of optical fibers that combines one or more beams of colored image light (e.g. Red, Green, and Blue) into a single fiber. The fiber array is selected from a group comprising: a single-mode fiber array, a polarization maintaining fiber array, a multi-mode fiber array, or some combination thereof. In some embodiments, the fiber array includes at least one-dimensional fiber array with a spacing of 30 microns to 1 millimeter between the fibers. The combining assembly 860 is an embodiment of the combining lens assembly 460. The combining assembly 860 includes an array of fibers (not shown here). The combining assembly 860 receives a source light 815A from the source element 620A. The source light 815A is image light generated by the source element 620A and transmitted through a fiber optic cable to the combining assembly 860. The source light 815B and the source light 815C are different embodiments of the source light 815A. Each of the source light 815A, the source light 815B, and the source light 815C are combined by the combining assembly 860 to achieve a full color pixel. In alternate embodiments, the source element 620A may be replaced by the source array 510A of FIG. 5A. In some embodiments, the source element 620A may be replaced by the source array 510B of FIG. 5B.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A waveguide display, comprising:
   a light source including an array of superluminous LEDs (SLEDs) that are configured to emit image light, and each SLED has a first end and second end that is opposite the first end, the second end configured to emit a respective portion of the image light, and respective distances between adjacent first ends are smaller than respective distances between adjacent second ends such that the array of SLEDs has a fanned out structure;
   a scanning mirror assembly configured to scan the image light to particular locations as scanned image light in accordance with scanning instructions;
   an output waveguide including an input area and an output area, the output waveguide coupled to receive the scanned image light emitted from the scanning mirror assembly at the input area, and output expanded image light from a portion of the output area, and a location of the portion of the output area is based in part on a direction of the scanned image light output from the scanning mirror assembly; and
   a controller configured to generate the scanning instructions and provide the scanning instructions to the scanning mirror assembly.

2. The waveguide display of claim 1, wherein the array is a one-dimensional array of superluminous LEDs (SLEDs).

3. The waveguide display of claim 2, wherein each SLED of the one-dimensional array of SLEDs comprises a ridge waveguide structure providing an optical confinement of the image light.

4. The waveguide display of claim 1, wherein the scanning mirror assembly performs at least one of: a raster scan, a biresonant scan, or a combination thereof.

5. The waveguide display of claim 1, wherein the image light comprises at least a first band of wavelengths, and a second band of wavelengths different from the first band of wavelengths.

6. The waveguide display of claim 5, wherein the first band of wavelengths is in the range of 700 nm to 1400 nm.

7. The waveguide display of claim 1, further comprising:
   a conditioning assembly configured to condition the image light from the light source, the conditioning assembly directing a conditioned image light toward the scanning mirror assembly.

8. The waveguide display of claim 1, wherein the array of SLEDs includes a pixel pitch of at least 30 microns.

9. The waveguide display of claim 1, wherein the scanning mirror assembly includes a Micro-Electro Mechanical System (MEMS) mirror configured to scan along two dimensions.

10. The waveguide display of claim 1, wherein the scanning mirror assembly performs a translation of at least one of the SLEDs in accordance with the image light emitted by the light source.

11. The waveguide display of claim 1, wherein the light source further comprises:
    a two-dimensional array of vertical cavity surface emitters; and
    an addressing circuit configured to address each of the vertical cavity surface emitters.

12. The waveguide display of claim 1, wherein
    the light source performs a temporal modulation of the image light to emit a temporally modulated image light, and
    the scanning mirror assembly performs a scanning of the temporally modulated image light in accordance with a target frame rate of the expanded image light.

13. A waveguide display, comprising:
    a light source including an array of superluminous LEDs (SLEDs) that are configured to emit image light, the image light comprising at least a first band of wavelengths and a second band of wavelengths, and each SLED has a first end and second end that is opposite the first end, the second end configured to emit a respective portion of the image light, and respective distances between adjacent first ends are smaller than respective distances between adjacent second ends such that the array of SLEDs has a fanned out structure;
    a combining assembly configured to combine the image light emitted by the light source and output a colored image light comprising a third band of wavelengths different from the first band and the second band;
    a scanning mirror assembly configured to scan the colored image light to particular locations in accordance with scanning instructions; and
    a controller configured to generate the scanning instructions and provide the scanning instructions to the scanning mirror assembly.

14. The waveguide display of claim 13, wherein the scanning mirror assembly performs at least one of: a raster scan, a biresonant scan, or a combination thereof.

15. The waveguide display of claim 13, wherein the image light comprises at least a first band of wavelengths, and a second band of wavelengths different from the first band of wavelengths.

16. The waveguide display of claim 13, wherein the light source further comprises:
    a two-dimensional array of vertical cavity surface emitters; and
    an addressing circuit configured to address each of the vertical cavity surface emitters.

17. The waveguide display of claim 13, wherein
    the light source performs a temporal modulation of the image light to emit a temporally modulated image light, and
    the scanning mirror assembly performs a scanning of the temporally modulated image light in accordance with a target frame rate of the expanded image light.

18. The waveguide display of claim 13, wherein the array of SLEDs includes a pixel pitch of at least 30 microns.

19. The waveguide display of claim 13, wherein the scanning mirror assembly includes a Micro-Electro Mechanical System (MEMS) mirror configured to scan along two dimensions.

20. A near-eye display (NED), comprising:
    a frame configured to be worn by a user;
    a waveguide display that is integrated into the display, the waveguide display comprising:
        a light source including an array of superluminous LEDs (SLEDs) that are configured to emit image light, and each SLED has a first end and second end that is opposite the first end, the second end configured to emit a respective portion of the image light, and respective distances between adjacent first ends are smaller than respective distances between adjacent second ends such that the array of SLEDs has a fanned out structure;

a scanning mirror assembly configured to scan the image light to particular locations as scanned image light in accordance with scanning instructions;

an output waveguide including an input area and an output area, the output waveguide coupled to receive the scanned image light emitted from the scanning mirror assembly at the input area, and output expanded image light from a portion of the output area, and a location of the portion of the output area is based in part on a direction of the scanned image light output from the scanning mirror assembly; and a controller configured to generate the scanning instructions and provide the scanning instructions to the scanning mirror assembly.

\* \* \* \* \*